United States Patent
Jansen et al.

(10) Patent No.: US 9,597,609 B2
(45) Date of Patent: Mar. 21, 2017

(54) MULTI-STAGE CRYSTALLISATION PROCESS AND APPARATUS TO PURIFY A COMPOUND

(71) Applicant: Sulzer Chemtech AG, Winterthur (CH)

(72) Inventors: Halbe Jansen, Wiesendangen (CH); Mathias Pfeil, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 14/759,990

(22) PCT Filed: Dec. 18, 2013

(86) PCT No.: PCT/EP2013/077079
§ 371 (c)(1),
(2) Date: Jul. 9, 2015

(87) PCT Pub. No.: WO2014/108285
PCT Pub. Date: Jul. 17, 2014

(65) Prior Publication Data
US 2015/0360143 A1   Dec. 17, 2015

(30) Foreign Application Priority Data
Jan. 14, 2013 (EP) .................................. 13151207

(51) Int. Cl.
*C30B 7/00* (2006.01)
*B01D 9/00* (2006.01)
*C01B 25/234* (2006.01)
*C01B 25/237* (2006.01)

(52) U.S. Cl.
CPC ......... *B01D 9/0059* (2013.01); *B01D 9/0036* (2013.01); *B01D 9/0045* (2013.01); *C01B 25/234* (2013.01); *C01B 25/237* (2013.01); *C01P 2006/80* (2013.01)

(58) Field of Classification Search
CPC ............ C30B 7/00; B01D 9/0013; B01D 9/00
USPC ....................................................... 23/295 R
See application file for complete search history.

(56) References Cited

U.S. PATENT DOCUMENTS

| | | |
|---|---|---|
| 3,621,664 A | 11/1971 | Saxer |
| RE32,241 E | 9/1986 | Saxer |
| 4,734,102 A | 3/1988 | Thijssen et al. |
| 5,504,247 A | 4/1996 | Saxer et al. |
| 6,145,340 A | 11/2000 | Stepanski et al. |
| 6,719,954 B2 | 4/2004 | Jansen |
| 6,852,881 B2 | 2/2005 | De Decker et al. |
| 7,319,166 B2 | 1/2008 | Hammon et al. |
| 8,034,312 B2 | 10/2011 | Scholz et al. |
| 8,481,784 B2 | 7/2013 | Kuppinger et al. |
| 2003/0018214 A1 | 1/2003 | Decker et al. |
| 2011/0105791 A1 | 5/2011 | Kuppinger et al. |

FOREIGN PATENT DOCUMENTS

| | | |
|---|---|---|
| CN | 1518530 A | 8/2004 |
| CN | 101423204 A | 5/2009 |
| DE | 10 2010 031 507 A1 | 12/2011 |
| EP | 1 970 349 A2 | 9/2008 |
| EP | 2 471 739 A1 | 7/2012 |
| JP | S53-073507 A | 6/1978 |
| JP | 2003-523968 A | 8/2003 |
| JP | 2010-501526 A | 10/2010 |
| WO | 2012/110118 A1 | 8/2012 |

*Primary Examiner* — Edward Johnson
(74) *Attorney, Agent, or Firm* — Larson & Anderson, LLC

(57) ABSTRACT

A process to purify a compound comprising a suspension crystallization step and additionally comprises a layer crystallization step and a storage step of an intermediate product obtained from the layer crystallization step before to its further purification in the suspension crystallization step.

21 Claims, 5 Drawing Sheets

MULTI-STAGE CRYSTALLISATION PROCESS AND APPARATUS TO PURIFY A COMPOUND

Figure 1:
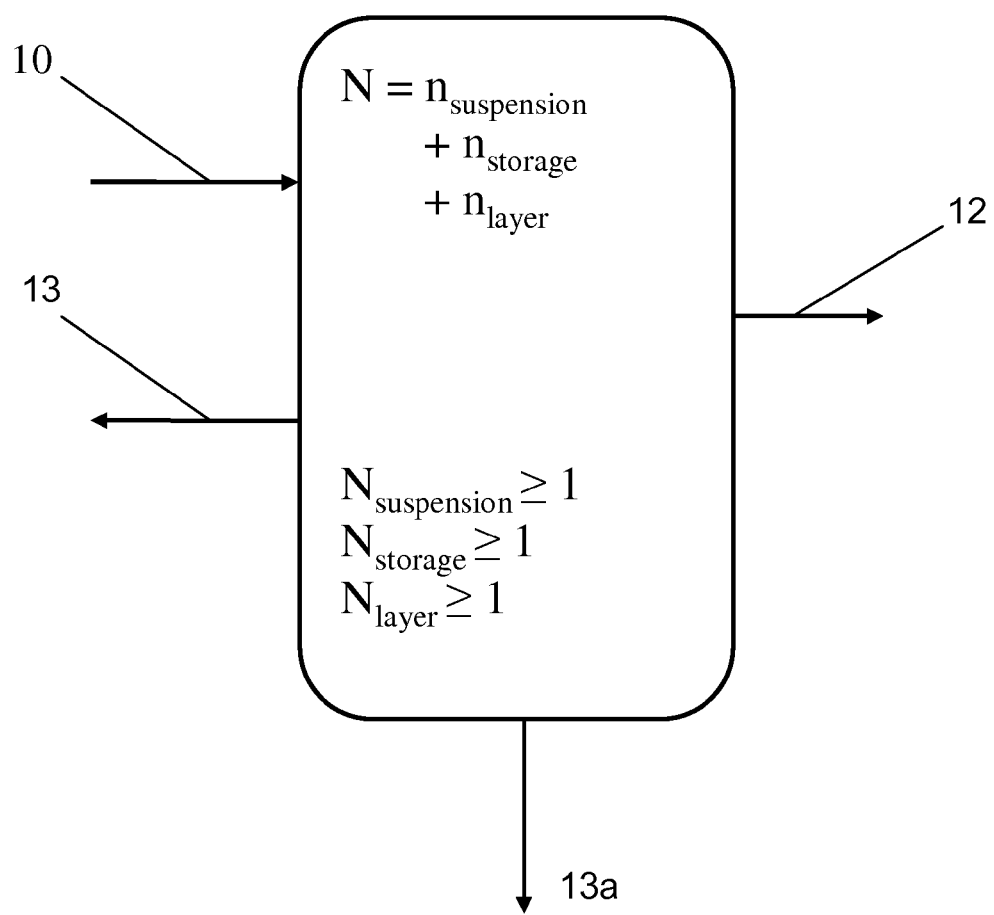

The invention relates to a process to purify a compound in accordance with the preambles of the independent claim 1 and an apparatus to purify a compound in accordance with the preambles of the independent claim 8.

A compound, for instance high purity phosphoric acid, purified from an impure compound, for instance a phosphoric acid feed, is suitable, in particular, for use in the semiconductor industry and in other electronics industries, e.g. as etchant. In those applications, the presence of minute amounts of metal or metalloid ions can already significantly impact the quality of a produced chips and circuit boards. Typical metallic impurities include potassium, sodium, iron, aluminum, and magnesium, and typical metalloid impurities include arsenic and boron. For example, the Global Process Chemicals Committee and the North American Process Chemicals Committee provide the industry with the specifications for such impurities in their document SEMI C36-0301—Specifications for Phosphoric Acid.

The compound in particular high purity phosphoric acid is required for various other uses, as well. Its unique ability to resist oxidation, reduction and evaporation makes it particularly useful for high purity industrial and manufacturing processes. As already mentioned above, an important application is the electronics industry, where for instance the phosphoric acid is used to etch away such parts of a photosensitive surface of a wafer that previously have been exposed to ultraviolet light. Due to the desired reaction between phosphoric acid in this application as an etchant and the metallic parts of the semiconductor product a significant amount of the acid has to be discharged from such process and replaced by fresh acid in order to avoid accumulation of these impurities towards an unacceptable level. Since a large amount of discharged acid accumulates and the tolerable levels are remarkably low it is therefore economically and ecologically attractive to recover such spent compound.

Many different purification processes are known from prior art. Their aim is to increase the purity level of the compound beyond those values, which are acceptable for other applications outside the electronics industry. Such known purification processes for compounds for use in industrial, food or pharmaceutical applications include solvent extraction, chemical precipitation, absorption, ion exchange methods among others. These known processes have the disadvantage of being complex and are typically limited to a specific impurity or type of impurity.

It is known in the art that crystallization processes or steps may be typically carried out in multiple stages such as either multiple layer crystallization or multiple suspension melt crystallization stages. In the present application, a crystallization step is defined as comprising one or more crystallization stages. Therefore a layer crystallization step comprises one or more layer crystallization stages, and a suspension crystallization step comprises one or more suspension crystallization stages.

Similarly purification apparatuses or crystallization units may comprise multiple crystallization sub-units such as either multiple layer crystallization or multiple suspension crystallization sub-units. In the present application, a crystallization unit is defined as comprising one or more crystallization sub-units. Therefore a layer crystallization unit comprises one or more layer crystallization sub-units, and a suspension crystallization unit comprises one or more suspension crystallization sub-units.

Additional information on crystallizers and their operation is disclosed in Handbook of Industrial Crystallization, 2nd Edition, by Allan S. Myerson, published Jan. 9, 2002 by Butterworth-Heinemann, Woburn, Mass. ISBN: 978-0750670128 and Crystallization Technology Handbook, 2nd Edition, edited by A. Mersmann, published 2001 by Marcel Dekker, Basel, ISBN: 0-8247-0528-9.

More background can be found on suspension crystallization in U.S. Pat. Nos. 8,034,312. 8,034,312 describes a method for the purification of high purity phosphoric acid by suspension crystallization. The high purity phosphoric acid is crystallized as a hemi-hydrate form and subsequent separation of such crystals in a wash-column produces a high purity acid/water solution that has been depleted of most of the metals, metalloids, and impurities other than water. Thereby is separated a phosphoric acid rich feed liquor into a high purity phosphoric acid hemi-hydrate and a mother liquor containing almost all impurities that were originally present in the feed. Individual metal and metalloid ion concentration in the high purity phosphoric acid is in the range of 100 to 1000 part per billion (ppb) of each metal or metalloid ion. It was found that the method has lower limits beyond which the concentration of some metal or metalloid ions may not be further reduced. Furthermore the method also leads to crystallization plants with large number of equipment and a low recovery of phosphoric acid from the feed. They also generate separate waste streams that must be treated separately and as a result are prohibitively expensive.

In addition U.S. Pat. No. 8,034,312 describes the effect of water addition on the viscosity of phosphoric acid. An undesirable consequence of the described method is the negative effect of the water addition on the wash column temperature difference, deltaT. Although U.S. Pat. No. 8,034,312 describes a positive effect of water addition on wash column effectiveness with respect to washing due to larger crystals and lower viscosity of the mother liquor. It is also a fact that the increased deltaT leads to lower porosity in the washed part of the crystal bed in the wash column. This porosity has a negative effect on the wash column capacity. In practice this means that the increased effectiveness must be balanced against the need for more equipment.

It is therefore the object of the invention to provide a process and an apparatus to purify a compound, in particular high purity phosphoric acid, that are economically attractive and operationally simple.

The subject matters of the invention satisfying this object are characterized by the features of the independent process claim 1 and the independent apparatus claim 8.

The dependent claims relate to particularly advantageous embodiments of the invention.

According to the invention, this is achieved by a process to purify a compound comprising a suspension crystallization step. Additionally the process comprises a layer crystallization step and a storage step of an intermediate product obtained from the layer crystallization step before its further purification in the suspension crystallization step. Analogous to the crystallization steps, the storage step may comprise one or more stages.

According to the invention, these objects are achieved by an apparatus for purifying a compound comprising a suspension crystallization unit. Additionally the apparatus comprises a layer crystallization unit and a storage unit located after the layer crystallization unit and before the suspension crystallization unit. Analogous to the crystallization units, the storage unit may comprise one or more sub-units.

The compound is purified by a combination of layer and suspension crystallisation, in which the intermediate product from layer crystallisation is further stored in the storage step and followed by further purification in the suspension crystallisation step.

To conduct the process, the apparatus for purifying a compound comprises one or more suspension crystallization sub-units, one or more layer crystallization sub-units and one or more storage sub-units located after the one or more layer crystallization sub-units and before the one or more suspension crystallization sub-units. An intermediate product may be conveyed from one unit or sub-unit to another by a conveyor for instance a pump and a pipe.

As a result the concentrations of all of the different metal or metalloid ions can be lowered to any desired level by combining a layer and a suspension crystallization step in series with a storage step in between. The process and the apparatus for purifying the compound, in particular high purity phosphoric acid, use the fact that the separation efficiency for different metal or metalloid ion impurities is very different for the different crystallization technologies. In layer crystallization few nuclei are formed and grown to large crystals whereas in suspension crystallization, relative to layer crystallization, an enormous number of nuclei are formed continuously which are then grown to relatively small crystals. With suspension crystallization, no matter how many suspension crystallization stages are applied, for some specific metal or metalloid ions no further reduction is possible below a certain metal or metalloid ion concentration. Surprisingly layer crystallization showed a stable further decrease in such metal or metalloid ion concentration with every step. Without wishing to be bound by any particular mechanism, the inventors believe that this surprising effect may be due to the capability of some compounds such as phosphoric acid to readily form complexes with metal ions and that such complexes then serve as nucleation sources. As a result there is thus a lower threshold limit for the minimum metal ion concentration in the molten crystal in the case of suspension crystallization, whereas this effect has negligible consequences for layer crystallization.

The major advantage of a combination of the two technologies, layer and suspension crystallization, and the storage step is that an industrial production and a high amount of the purified compound is now possible. Furthermore, it is also possible to recover the compound from the feed. Even though this recovery is less important as the reject from the crystallization can be used for other applications, which are less demanding in terms of metal or metalloid ion concentration. To reduce the number of crystallization steps it is however of interest to use a feed that is as low as possible in metal or metalloid impurity concentration. This feed will have a higher cost price than normal feed and high recovery becomes an economic advantage.

Furthermore, one of the advantages due to usage of the storage step and unit is that it makes it possible to combine in one process the advantages of layer crystallization with those of suspension crystallization. Besides, the process and apparatus of the invention will be suitable to produce ultra pure compounds from an impure feed.

Due to the advantageous application of combined layer and suspension crystallization and storage steps and units the final product is essentially the ultra pure compound.

The compound in the invention is not specifically limited, and it may be inorganic, organic or organometallic in nature. Particularly preferred compounds will be those that readily form complexes with metal or metalloid ions such as those compounds having acidic groups or basic groups. Some examples of compounds readily forming metal complexes are those containing sulfonate, phosphonate, amine, cyano, carboxylate, oxylate, acetate, thiol functional groups. Inorganic and organic acids are also compounds that readily form metal complexes. In a preferred embodiment the compound is phosphoric acid. Due to the fact that phosphoric acid, in particular high purity phosphoric acid or electronic grade phosphoric acid, has very special specifications (e.g. according to SEMI C36-0301) to come down to the required ppb levels of impurities, application of combined layer and suspension crystallization and storage steps are very advantageous. Furthermore, the process and apparatus are particularly good because they are flexible in feed stream properties and qualities for producing phosphoric acid. Besides, a very high recovery for the same feed is possible.

According to another preferred embodiment the purified compound contains one or more metallic or metalloid impurities, preferably arsenic and/or boron, wherein the concentration of each metal or metalloid impurity is less than 1000 ppb, preferably less than 250 ppb, more preferably 100 ppb, most preferably 50 ppb. As a result all different metal an metalloid ion concentrations can be lowered to the mentioned level and the product is a high purity compound for instance electronic grade phosphoric acid for chip etching. A variety of methods for measuring inorganic impurities such as metals and metalloids are known in the art. Such methods include mass spectrometry, atomic absorption spectroscopy (AAS), Inductively Coupled Plasma-Atomic Emission Spectrometry (ICP-AES), stripping voltammetry, and ion chromatography. The concentrations of these impurities according to the present invention are measured by mass spectrometry. The application of mass spectroscopy for the analysis of metallic and metalloid impurities is well-known in the art, for example, as described in Applications of Inorganic Mass Spectrometry, by J. R. de Laeter, published by Wiley in 2001, ISBN-13: 978-0471345398.

A further embodiment of the invention is that the process comprises one layer crystallization stage and two or more, preferably three, suspension crystallization stages, wherein the one layer crystallization stage is carried our before the two or more, preferably three, suspension crystallization stages. The compound in particular high purity phosphoric acid is known for its capability to form complexes with metal and metalloid ions and such complexes serve as nucleation sources thus causing a lower limit for the metal and metalloid ion concentration in the molten crystal for suspension crystallization. Layer crystallization showed a stable decrease in such metal and metalloid ion concentration from stage to stage. Therefore it is an advantage to carry out one or more layer crystallization stages before the two or more, preferably three suspension crystallization stages. This embodiment describes a configuration that has been tested showing the effect of the method on the metal and metalloid impurity concentrations in the example.

According to another preferred embodiment the one or more layer crystallization stages are carried out in a static crystallization unit or a falling film crystallization unit, preferably a static crystallization unit. In a further preferred embodiment of the invention the one or more layer crystallization sub-units are static crystallization sub-units or falling film crystallization sub-units, preferably static crystallization sub-units.

The various crystallization units or sub-units can be equipped for instance with appropriate buffer vessel(s) and fluid connections so that additional further crystallization stages may be carried out within the same unit or sub-units.

The various product and byproduct streams from the crystallization units or sub-units may be conveniently controlled by means of the mass balance in collecting vessels directly connected to the crystallization unit or sub-unit. The heating and cooling requirements of the crystallization units and sub-units can vary for instance as a function of time, and energy buffer systems may be advantageously used in order to minimize the fluctuations in the demands for steam and refrigeration. The crystallization units and sub-units may be conveniently controlled by a computer system using level and temperature measurement instruments, as well as on/off or control valves.

Besides, an outlet of the layer crystallization unit is in fluid communication with the inlet of the storage unit and an outlet of the storage unit is in fluid communication with the inlet of the suspension crystallization unit. Fluid communication means that a conveyor, for instance a pump and/or a pipe, transports the fluid between the layer crystallization unit outlet to the suspension crystallization unit inlet and/or between the storage unit. The temperature of the crystallization in a specific crystallization unit or sub-unit as referred to in the specification of this application is expressed in degrees Celsius (° C.), and it is measured by measuring the melting point of the mother liquor stream removed from the specific crystallization unit or sub-unit. Due to a high viscosity of the compound the static crystallization unit is preferred. Static crystallization therefore is an economic method of purifying on a large industrial scale.

Falling film crystallization units and their operation are well-known in the art, for example, as disclosed in U.S. Re. 32,241 or U.S. Pat. No. 3,621,664. Unless indicated otherwise, conventional falling film crystallization units may be used and operated as known in the art. Static crystallization units and their operation are well-known in the art, for example, as disclosed in Sulzer Technical Review February 1999 pp. 8-11, Sulzer Technical Review January 2006 pp. 4-6, or U.S. Pat. No. 6,145,340.

According to a preferred embodiment of the invention any suspension crystallization step present in the process comprises a solid-liquid separation and washing stage, and wherein the solid-liquid separation and washing stage is carried out in a wash column having a melt circuit, preferably a packed bed wash column. Besides, a solvent is added to the melt circuit, wherein the solvent is preferably water.

Wash columns have a very high separation efficiency, for instance crystals going to the wash column are recovered as a product. Centrifuges wash cake with part of product which is recycled to crystallizing step (10-15%) and thus requires a higher crystallizer capacity. In contrast, the wash liquid in a wash column is not mixed with mother liquor in the wash column. Advantageously the problems as mentioned in the beginning of this section are solved by combining the suspension crystallization unit with a wash column as a separation device for the compound. In addition, it has been found that despite the high viscosities as present in the process of the invention and its examples here, (i) a crystal product could be obtained which is treatable in a wash column by adding a solvent to the melt circuit, preferably water, and (ii) high purification ratios can be obtained with such a wash column device.

The method according to the invention improves wash column effectiveness and capacity simultaneously by adding the water not to the mother liquor as in U.S. Pat. No. 8,034,312 but to the melt loop using a metering pump. The viscosity lowering effect is now not restricted to the mother liquor (important for the non-washed part of the crystal bed) but also occurring for the wash liquid (important for the washed part of the bed). This general lowering of viscosity in the entire wash column crystal bed causes a capacity increase. An additional benefit is that the total amount of water added can be less. The extra water added to the wash liquid (for example the wash liquid may contain 8.4% of water in one embodiment) will not re-crystallize at the wash front (one Mol of water will crystallize at the wash front together with two Moles of phosphoric acid to form one Mole new hemi hydrate crystal) and therefore be mixed with the mother liquor in the unwashed part of the crystal bed. The mixing of mother liquor between the crystals in the unwashed part of the crystal bed with mother liquor in the bulk is a slow process and therefore the concentration of water in the mother liquor between the crystals in the crystal bed in equilibrium conditions (conditions after reaching steady state operation) will be higher than the water concentration in the mother liquor present in the crystallizer slurry.

In a preferred embodiment, the layer crystallization unit is a static crystallization unit or falling film crystallization unit, preferably a static crystallization unit. A falling film crystallizer is an option for layer crystallization but only in a small range of high viscosity liquids. Whereas, the static crystallizers is preferred because of its large operating window.

The apparatus additionally comprises one or more wash columns for a melt circuit, preferably packed bed wash columns. Furthermore the melt circuit has an inlet for adding a solvent. The suspension crystallization unit will have a solid-liquid separator sub-unit. In a preferred embodiment the solid-liquid separator unit comprises one or more wash columns with a melt circuit, preferably packed bed wash columns. The process described above is conducted and applied in the apparatus in particular in the one ore more wash columns.

In yet another preferred embodiment the purification of a feed stream to form a purified compound having one or more metallic or metalloid impurities, wherein the concentration of each metal or metalloid impurity is less than 1000 ppb, preferably less than 250 ppb, more preferably 100 ppb, most preferably 50 ppb. Besides, one can use the apparatus for the production of electronic grade phosphoric acid as specified by SEMI C36-0301.

Figure 2:
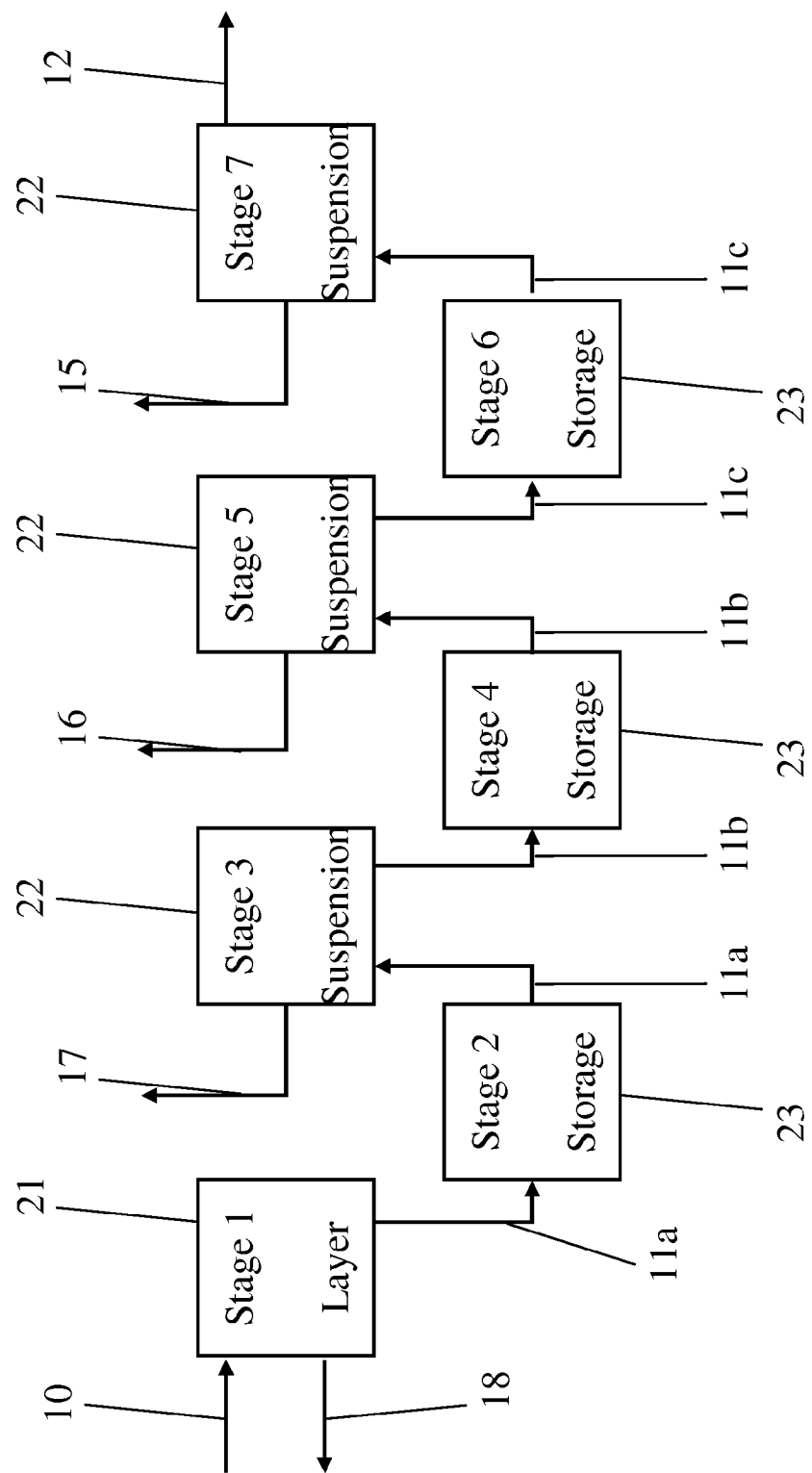
Figure 3:
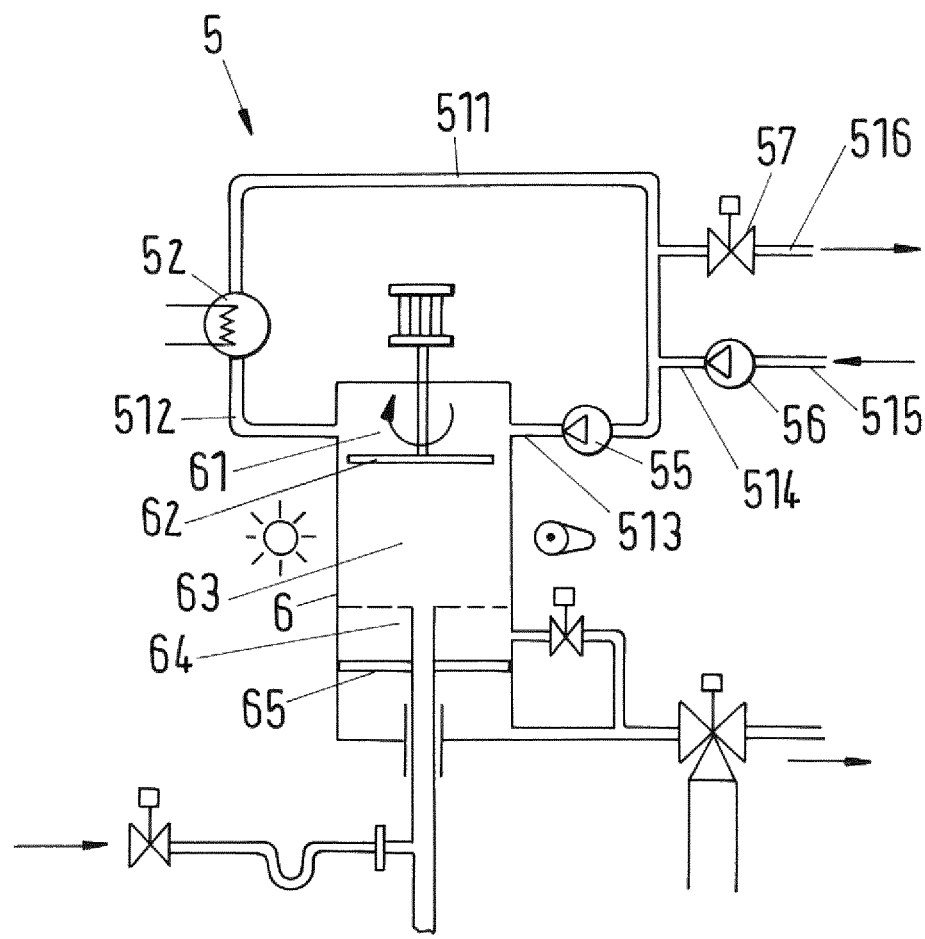
Figure 4:
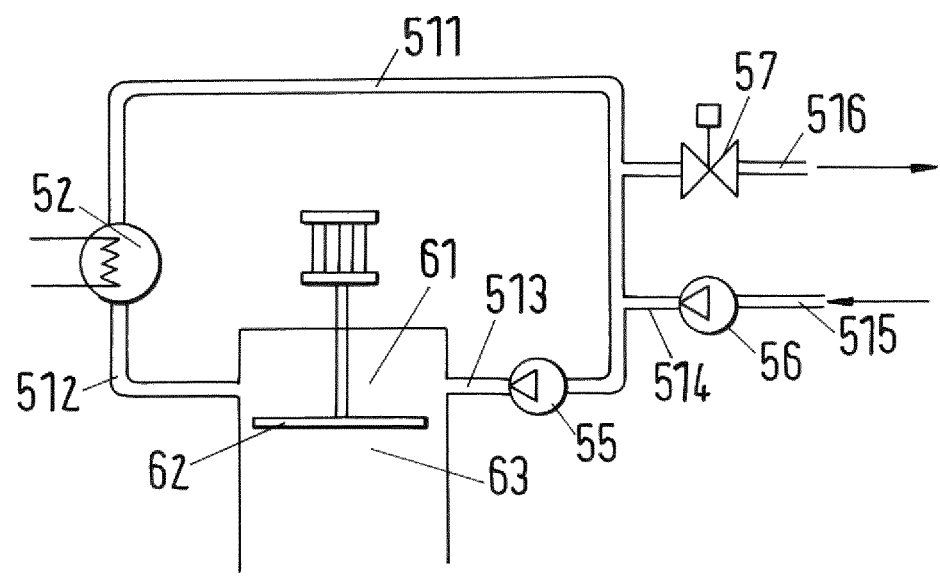
Figure 5:
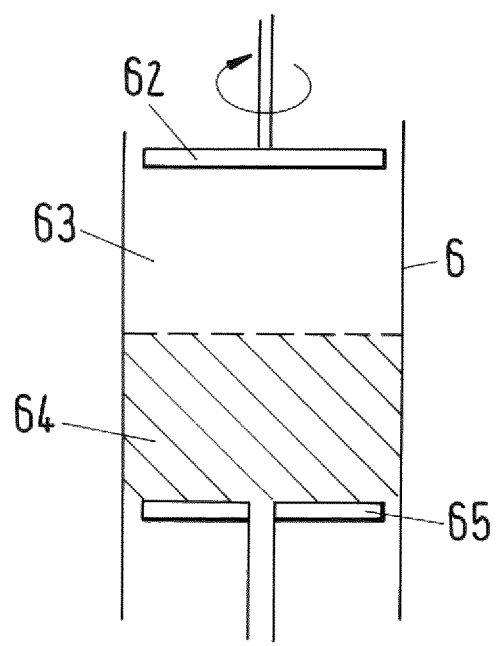

The invention will be explained in more detail in the following with reference to the drawing. There are shown in a schematic representation:

FIG. 1 block diagram showing the possible combinations of layer and suspension crystallization according to the invention;

FIG. 2 block diagram of a first embodiment of the crystallization process according to the invention;

FIG. 3 a first embodiment of a wash column with water addition, crystal bed and adjacent apparatus parts according to the invention;

FIG. 4 the scraper side of piston type wash column together with the melt loop in detail;

FIG. 5 the crystal bed in the wash column and the adjacent components in detail.

FIG. 1 shows a block diagram showing the possible combinations of layer and suspension crystallization steps and stages according to the invention. N represents the total number of crystallization stages. $n_{suspension}$ represents the number of stages using suspension crystallization technology, $n_{layer}$ the number of stages using layer crystallization technology and $n_{storage}$ the number of stages using storage technology. The sequence of the technologies and the number of stages is a function of the feed composition, the recovery requirement and the required product specification. A stage does not necessarily represent hardware in the form of a crystallization unit or sub-unit. It is possible to carry out one or more stages in the same unit. For example one may carry out multiple stages in multiple units or one may carry out multiple stages in the same unit, making use of intermediate storage steps/units. To carry out multiple stages in the same unit and also to connect a layer crystallization step, by nature a batch process, to a suspension crystallization step, by nature a continuous process, buffer tanks are required between the various steps and stages. The process is carried out with an apparatus according to the invention.

In FIG. 1, stream 10 is the feed liquid. The feed liquid has for instance less than 1 wt % impurities besides phosphoric acid and water. Stream 12 is the final purified compound in particular high purity phosphoric acid. Typically all metal and metalloid impurities, preferably arsenic and/or boron, are less than 100 ppb. Stream 13 is the reject stream from the first step and, normally also the plant reject ("plant" meaning to be the combination of all units and sub-units and their operations), however, it is possible that some reject is withdrawn from the plant between stages (represented in FIG. 1 by stream 13a). The last option would lower the recovery of the total crystallization operation. This is only to be considered for a specific stage if the impurity concentration of the reject from the following stage is higher than that of the feed of the specific stage. The resulting lower impurity concentration in the mother liquor of the specific stage would lead to a higher purity product from that specific stage. This could lead to elimination of one or more stages to achieve the required purity of the final purified product. This should then be balanced against the loss of recovery.

The storage step of the invention is embodied such that it enables the continuous suspension crystallization step to be continuously fed by a product stream emitted from the batch layer crystallization step. Typically the storage step will take place in a storage unit which therefore acts a buffering tank between the batch layer crystallization and the continuous suspension crystallization. The storage unit is not specifically limited as to size, volume or construction, and the optimum volume will depend on the detailed natures of the layer crystallization step and unit and the suspension crystallization step and unit. The volume of the storage unit will generally be sufficient such that it may hold all of the intermediate product produced by the layer crystallization step and also hold enough feed to maintain the continuous operation of the suspension crystallization unit.

For example, smaller capacity layer crystallization units may not themselves require a large capacity storage unit, but more frequent batch layer crystallization steps may be required as a result to produce sufficient buffering volume to supply a given capacity suspension crystallization unit. Conversely larger capacity layer crystallization units may require a larger capacity storage unit but less frequent batch crystallization steps. On the other hand, high throughput suspension crystallization units and high suspension crystallization production rates will tend to require larger capacity storage units and also more frequent batch layer crystallization steps or larger capacity layer crystallization units. Lower throughput suspension crystallization units or lower suspension crystallization production rates will be able to make use of smaller volume storage units. One skilled in the art will thus understand how to determine the appropriate volume requirements for the storage unit and storage step based on the relative flow and production rates and capacities of the layer and suspension crystallization units and steps. At the start of the purification process, one will typically begin running the layer crystallization unit batch-wise into the storage unit to build sufficient buffering capacity in the storage unit prior to starting the suspension crystallization unit.

FIG. 2 shows a block diagram of a first embodiment of the crystallization process according to the invention which represents one of the tested embodiments. The embodiment has a layer crystallization stage consisting of one stage and is followed by a suspension crystallization stage consisting of three equal suspension crystallization stages. The layer crystallization stage is carried out using a layer crystallization unit 21 which is a static crystallization unit or a falling film crystallization unit. The suspension crystallization stage is carried out using a suspension crystallization unit 22. The storage stage is carried out using a storage unit 23.

The streams at the layer crystallization unit are as follows, stream 10 is the feed liquid, stream 11a the intermediate product stream of stage 1 to stage 2 and stream 18 is the reject stream of stage 1. The storage unit 23 at stage 2 only stores the intermediate product stream 11a. In a similar way the suspension crystallization unit 22 for stage 3 is fed by a intermediate product stream 11a from stage 1, and it emits reject stream 17 and intermediate product stream 11b for feeding the suspension crystallization unit 22 for stage 5, at which it is possible to store the intermediate product stream 11b at stage 4 in a storage unit 23. The following suspension crystallization units 22 for stages 5 and 7 are fed by the intermediate product streams 11b and 11c of the previous unit 22 from stages 4 and 6 respectively. In turn each of these units 22 emits a reject stream 16 and 15, and intermediate product stream 11c and product stream 12. The product stream 12 is then the final purified product stream of the process of this embodiment. Not shown in the figure is that the various crystallization units can be equipped for instance with appropriate buffer vessel(s) and fluid connections so that additional further workflow stages may be carried out within the same unit.

FIG. 3 is an example embodiment of a piston type wash column 5, as described for example in U.S. Pat. No. 6,719,954, with a melt loop according to the invention where a metering pump 56 is used to pump a specific amount of water to the melt loop. The invention is not limited to the use of a piston type wash column in the suspension crystallization stage. Other wash column types such as for example described in U.S. Pat. No. 4,734,102, can be used and these different types can be installed with the melt loop on top or at the bottom. Nor is the invention limited by the use of a metering pump 56 to introduce water into the melt loop. The invention includes any other means of controlled addition of water to the melt loop.

Item 63 is the top part of wash column cylinder with the washed packed bed of crystals. The crystal bed is disintegrated by a rotating scraper disc 62 and the scraped crystals are mixed with a liquid stream consisting of melted crystals and introduced in the scraper head 61 through conduit 513. The crystal bed has a washed part (with wash liquid between the crystals) 63 and an unwashed part (with mother liquor between the crystals) 64. The crystal bed is enclosed by a cylinder 6 and a piston filter 65. The mixture of crystals and liquid leaves the scraper head through conduit 512 which leads to a heat exchanger 52, where enough heat is passed to the mixture to melt the crystals. Conduit 511 leads the mixture to the suction side of the melt loop pump 55. The discharge side of the melt loop pump is connected to the scraper head 61 via conduit 513 thereby effectively completing the loop. A product discharge valve 57 is situated on the suction side of the melt loop pump. This valve is operated by the wash column control system and product is periodically discharged to the product storage location through conduit 516. A metering pump 56 is introducing water into the melt loop through conduit 514. On the suction side of the metering pump is a conduit 515 that connects the pump with a source of water (for example a water feed tank). The location where water is introduced in the melt loop is between the connection to product discharge valve 57 and the suction side of the melt loop pump 55, to insure good mixing of the water with the mixture before the product leaves the melt loop through the product discharge valve 57.

In the wash column operation wash liquid (molten hemi hydrate) flows through the crystal bed from the scraper side to the piston filter side under the influence of a hydraulic pressure difference between the two sides. The small crystal bed zone between the washed 63 and un-washed 64 part is called the wash front. Crystals and liquid in the un-washed part 64 of the crystal bed have the temperature of the slurry feed to the wash column 5 and the crystals and liquid in the washed part 63 are at the melting point temperature of pure hemi hydrate. This temperature difference causes the wash liquid to crystallize on the outside of the un-washed crystals. The released heat of crystallization warms the crystals to the melting point of the pure hemi hydrate. According to the invention water is added to the mixture in the melt loop. The wash liquid is now molten hemi hydrate with extra water and a lower viscosity that that of pure molten hemi-hydrate. At the wash front hemi-hydrate crystallizes as described above but the extra water will mix with the mother liquor and reduces the viscosity of the mother liquor. With every new stroke of the wash column part of the mother liquor in the un-washed bed is replaced with new mother liquor that enters the wash column together with the new feed crystals.

FIG. 4 shows the scraper side of piston type wash column together with the melt loop as described above. FIG. 5 shows the crystal bed in the wash column and the adjacent components as described above.

EXAMPLES

The following examples are set forth to provide those of ordinary skill in the art with a detailed description of how the processes and apparatus claimed herein are evaluated, and they are not intended to limit the scope of what the inventors regard as their invention.

In the first example, the process and the apparatus of the invention was successfully used in a typical application to purify a compound as shown in FIG. 2.

Table 1 shows the analysis results for two different metalloid ion impurities viz. one, Arsenic (As), that is separated better with layer crystallization and another one, Boron (B), that is better separated with suspension crystallization. The separation is quantified by the distribution coefficient which is defined here as concentration of impurity component in reject divided by the concentration of the same impurity component in the product. The analysis illustrates the relatively high Boron reduction per stage in suspension crystallization when compared with layer crystallization and the opposite for Arsenic. The concentration of metalloid ion is expressed as parts per billion (ppb). There are several well-known methods in the art to measure the parts per billion (ppb) concentrations of metals and metalloids. In the present application, all measurements are carried out by mass spectrometry, and all concentrations are defined as those measured by mass spectrometry.

TABLE 1

Analysis results for two different metalloid ion impurities

| | metal concentration | |
|---|---|---|
| stream no. | As ppb | B ppb |
| 10 | 135 | 43000 |
| 11 | 35 | 16500 |
| 18 | 235 | 69500 |
| distribution coefficient stage 1 layer | 7 | 4 |
| 12 | 15 | 1100 |
| 17 | — | — |
| distribution coefficient stage 2 suspension | — | — |
| 13 | 15 | 140 |
| 16 | 15 | 2800 |
| distribution coefficient stage 3 suspension | 1 | 20 |
| 14 | 15 | <20 |
| 15 | 15 | 300 |
| distribution coefficient stage 4 suspension | 1 | >15 |

The results of using the apparatus of the invention with a typical feed to the crystallization operation with a phosphoric acid concentration of 84% is shown. From a process point of view the recovery in suspension crystallization is limited by the maximum deltaT over the wash front. In practice that means that the temperature of the feed to the wash column, which equals the temperature at which the crystals are formed, can be no lower than approximately +5 to +10° C. This corresponds to a mother liquor containing 80-82 wt % phosphoric acid. In contrast a layer crystallization stage can be operated at a crystallization temperature of −5 to −10° C. corresponding to a mother liquor containing 76-77 wt %. The method according to the invention therefore doubles the recovery. The example further demonstrates that the process and apparatus of the invention may be used to reduce the concentration of arsenic and/or boron impurities to less than 1000 ppb, preferably less than 250 ppb, more preferably 100 ppb, most preferably 50 ppb.

In the second example, the process and apparatus of the invention was successfully used to demonstrate the benefit of adding water to the melt loop (ML) as shown in FIG. 5 versus the prior art method of U.S. Pat. No. 8,034,312. Advantageously adding water to the melt loop also increases the water concentration in the unwashed part of the mother liquor. Additionally the effect on lowering the viscosity of adding a specific quantity of water to the melt loop has a greater effect than adding the same amount of water to the crystallization.

The values in table 2 represent the water concentration of the mother liquor that is present between the crystals in the un-washed part of the crystal bed. Assumed is a concentration of 16 wt % in the mother liquor that is fed to the wash column (slurry feed) and a bed porosity of 30%. The values are then calculated for different water additions to the melt, for example by adding 1% or more to the 16 wt %, and different refreshment factors with the help of a mass balance. Typically a few weight percent of water is added per unit mass of hemi-hydrate produced. The effect on the water concentration of the mother liquor between the crystals in the un-washed part of the crystal bed in the wash column can be determined with the help of a simple mass balance. The calculation results are shown in table 2 below. The ML refreshment is a measure for the rate with which the mother liquor in the un-washed crystal bed is replaced by mother liquor in the feed to the wash column. The measured capacity increase of 20% with the addition of 1 wt % water per weight of produced hemi-hydrate from the wash column supports the assumption (exact values are not available) that the ML refreshment is lower than approximately 10%.

TABLE 2

Water concentration in unwashed bed as function of added water in melt circuit and refreshment rate at 25% recovery.

|  |  | ML refreshment | | |
|---|---|---|---|---|
|  |  | 5% | 10% | 20% |
| water added | 1% | 27.4 | 23.2 | 20.9 |
|  | 2% | 34.8 | 27.6 | 23.4 |
|  | 3% | 40.9 | 31.6 | 25.9 |
|  | 4% | 45.9 | 35.2 | 28.1 |

The invention claimed is:

1. A process to purify a compound comprising:
   (i) a suspension crystallization step,
   (ii) a layer crystallization step,
   (iii) a storage step of an intermediate product obtained from the layer crystallization step before its further purification in the suspension crystallization step.

2. The process of claim 1, wherein the compound is phosphoric acid.

3. The process of claim 1, wherein the compound contains one or more metallic or metalloid impurities, wherein the concentration of each metal or metalloid impurity in the compound is reduced in the process to less than 1000 ppb.

4. The process of claim 3, wherein the one or more metallic or metalloid impurities comprise arsenic and/or boron.

5. The process of claim 1, wherein the process comprises one layer crystallization stage and two or more suspension crystallization stages, wherein the one layer crystallization stage is carried out before the two or more suspension crystallization stages.

6. The process of claim 1, wherein the process comprises one layer crystallization stage and three suspension crystallization stages, wherein the one layer crystallization stage is carried out before the three suspension crystallization stages.

7. The process of claim 1, wherein any layer crystallization step or stage present in the process is carried out in a static crystallization unit or a falling film crystallization unit.

8. The process of claim 7, wherein the process is carried out in a static crystallization unit.

9. The process of claim 1, wherein any suspension crystallization step or stage present in the process comprises a solid-liquid separation and washing stage, and wherein the solid-liquid separation and washing stage is carried out in a wash column having a melt circuit.

10. The process of claim 9, wherein the wash column is a packed bed wash column.

11. The process of claim 9, wherein a solvent is added to the melt circuit.

12. The process of claim 9, wherein the solvent is water.

13. An apparatus for purifying a compound comprising:
   (i) a suspension crystallization unit,
   (ii) a layer crystallization unit,
   (iii) a storage unit located after the layer crystallization unit and before the suspension crystallization unit.

14. The apparatus of claim 13, wherein the layer crystallization unit is a falling film crystallization unit.

15. The apparatus of claim 13, wherein the layer crystallization unit is a static crystallization unit.

16. The apparatus of claim 13, additionally comprising a wash column for a melt circuit.

17. The apparatus of claim 16, wherein the wash column is a packed bed wash column.

18. The apparatus of claim 16, wherein the melt circuit has an inlet for adding a solvent.

19. A method for using the apparatus of claim 13 for the purification of a feed stream comprising a compound containing one or more metallic or metalloid impurities, wherein the concentration of each metal or metalloid impurity in the compound is reduced in the use to less than 1000 ppb, the method comprising the step of introducing the feed stream to the layer crystallization unit.

20. The method use of claim 19, wherein the method is satisfactory for the production of electronic grade phosphoric acid in accordance with SEMI C36-0301.

21. The apparatus of claim 13, wherein the apparatus is configured such that a feed flows from the layer crystallization unit into the storage unit and then into the suspension crystallization unit.

* * * * *